United States Patent

[11] 3,592,525

| [72] | Inventor | Donald Herbert Schultz |
| | | Black Forest, South Australia, Australia |
| [21] | Appl. No. | 824,159 |
| [22] | Filed | May 13, 1969 |
| [45] | Patented | July 13, 1971 |
| [73] | Assignee | Sola International Pty. Ltd. |
| | | Black Forest, South Australia, Australia |
| [32] | Priority | May 16, 1968 |
| [33] | | Austria |
| [31] | | 37953/68 |

[54] ILLUMINATING HEADPIECE FOR SPECTACLES INCLUDING SECONDARY MAGNIFYING LENSES
4 Claims, 3 Drawing Figs.

[52] U.S. Cl. .................................................. 350/146,
350/130, 350/141, 350/145, 350/212, 351/16,
351/41, 351/158

[51] Int. Cl. .................................................. G02b 25/02,
A61b 3/12

[50] Field of Search .......................................... 350/130,
137, 138, 141, 143, 145, 146, 212, 159; 351/1, 6,
9, 16, 41, 158

[56] References Cited
UNITED STATES PATENTS

| 1,615,067 | 1/1927 | Boerman .................... | 351/158 X |
| 1,741,264 | 12/1929 | Wappler .................... | 351/158 X |
| 2,196,543 | 4/1940 | Anderson .................... | 351/158 X |
| 2,389,428 | 11/1945 | Glasser .................... | 350/146 UX |
| 2,902,899 | 9/1959 | Crippers et al. .................... | 351/9 X |
| 3,035,483 | 5/1962 | Andreas et al. .................... | 351/16 X |
| 3,064,528 | 11/1962 | Gelatt .................... | 350/146 X |
| 3,273,456 | 9/1966 | Feinbloom .................... | 350/146 |
| 3,350,552 | 10/1967 | Lawrence .................... | 351/158 UX |
| 3,014,405 | 12/1961 | Swikart .................... | 350/146 |

FOREIGN PATENTS

| 552,355 | 4/1923 | France .................... | 350/212 |
| 840,622 | 4/1939 | France .................... | 351/158 |
| 521,770 | 5/1940 | Great Britain .................... | 351/159 |

*Primary Examiner*—David Schonberg
*Assistant Examiner*—Paul A. Sacher
*Attorney*—Wofford and Felsman ABSTRACT: An illuminating headpiece suitable for use by dentists wherein a pair of secondary lenses extend through apertures in respective spectacle glasses in a frame so as to be closer to the pupil of the user than the spectacle glass. The spectacle frame carries on it a lamp housing for illuminating the object to be viewed through the secondary lenses. The secondary lenses may each be constituted by a single lens having an inner lens surface of toroidal or spherical shape and an outer lens surface of aspherical shape.

ILLUMINATING HEADPIECE FOR SPECTACLES INCLUDING SECONDARY MAGNIFYING LENSES

This invention relates to an illuminating headpiece which is useful for dentist, ophthalmic surgeons and other users who require a lightweight effective headpiece for viewing a small area in stereopsis.

At the present time dentists and ophthalmic surgeons frequently make use of a large light source having a large reflector and employ mirrors so that they can accurately see the work which is to be attended to. However, this is unsatisfactory in many ways, firstly in that the head of the surgeon obstructs a large amount of light, and secondly that the light is so general that it becomes difficult to get a sufficient concentration on the area of work. To overcome this problem it has been proposed to utilize headpieces previously and such head pieces have included lenses arranged to direct beams of light from light sources carried on the heads of the operators, but these have been heavy and clumsy and are frequently of not much greater use than the fixed light source type of device.

With the object of providing a simpler and more comfortable device which will provide a higher concentration of light on a work area this invention may in one of its forms include an illuminating headpiece comprising a spectacle frame, a pair of spectacle glasses in the frame, apertures in the glasses, a pair of secondary lens magnifying systems extending through respective aperture and carried by the spectacle glasses, a lamp housing on the spectacle frame, and a lamp in the lamp housing. This then enables the user to concentrate light on to a work area and to view that work area with some magnification. By passing the secondary lens magnifying systems through the glasses of the spectacles and brining the inner lens surfaces closer to the eye of the user, the angles subtended by the lens surfaces relative to the eye is increased, with consequential improvement in vision. Furthermore, the usual compromise of correction of distortion and astignation is avoided if the distance between the inner lens surface and the viewing eye is small.

An embodiment of the invention is described hereunder in some detail with reference to and is illustrated in the accompanying drawings, in which.

Figure 1:
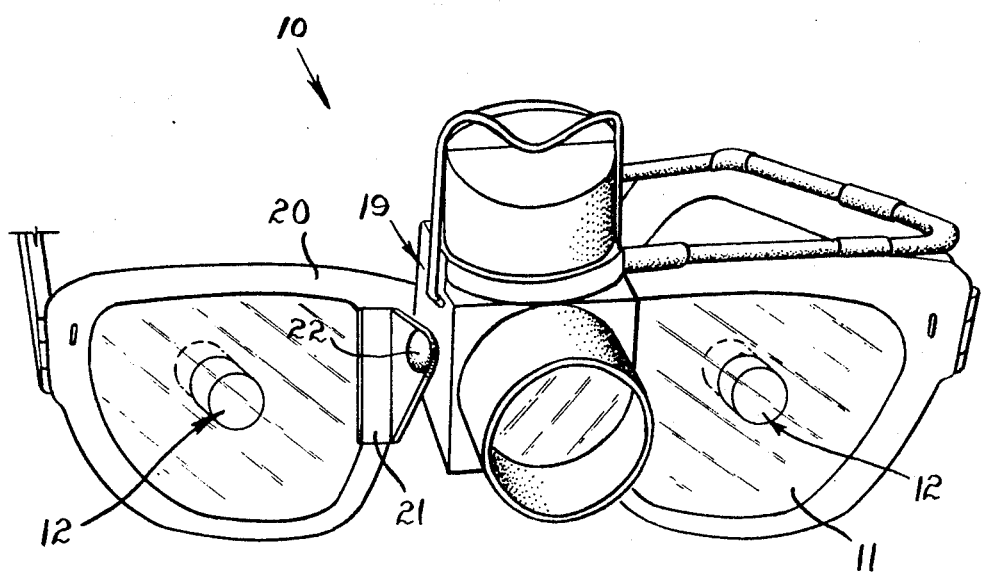
FIG. 1 is a perspective view of an illuminating head piece.
Figure 3:
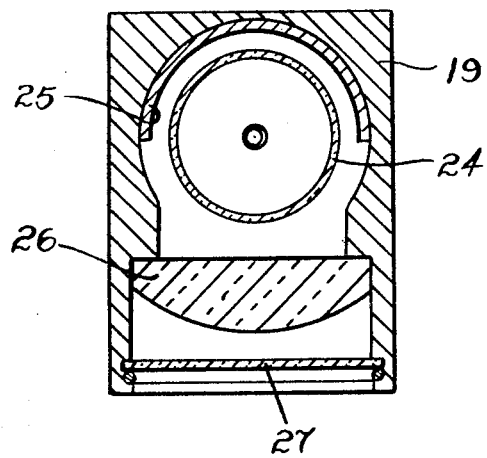
FIG. 3 is a central plan section through the lamp housing.
Figure 2:
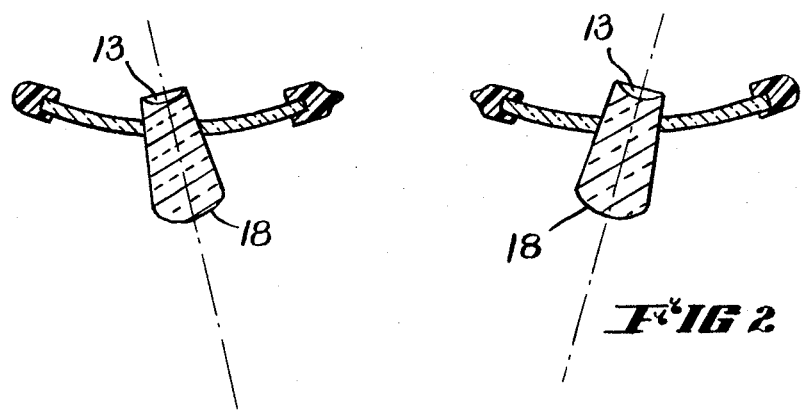
FIG. 2 is a central plan section, omitting the lamp housing.

According to this embodiment a pair of spectacles 10 are provided with their glasses 11 each supporting a small lens magnifying system 12, the two lens magnifying systems being directed to have their axes intersect at a work plane (not shown) which in this embodiment is displaced about 20 centimeters from the glasses of the spectacles. The support for the lens magnifying systems is achieved by apertures in the glasses through which the magnifying systems pass and in which they are cemented closer to the eyes of an operator than the glasses so that the inner lens surfaces 13 subtend a wide angle, while the axes are so directed that the object plane is viewed with some degree of magnification.

The angle determines the degree of stereopsis and this is useful for working purposes.

Each lens magnifying system in this embodiment is constituted by a single element having its inner surface 13 spherical or toroidal and its outer surface 18 aspheric in shape, and by having a single element the efficiency is high.

A central lamp housing 19 is secured to the frame 20 of the spectacles 10 (which should be as rigid as possible), and the lamp housing 19 is positioned between the two lamp housing support brackets 21 between which the lamp housing is pivotally mounted on pivot pins 22. The lamp housing support brackets 21 frictionally engage the lamp housing so that the lamp housing can be tilted to reset its position to correctly direct a beam of light to the focal plane. The lamp housing contains a lamp 24 which is provided with a mirror 25 adjacent its rear surface, and its front surface is adjacent an aspheric lens 26, the lens 26 being slightly out of focus with the object plane. This prevents interference due to the image of the lamp filament. An infrared filter 27 is retained in the lamp housing 19 in front of the lens 26.

In order to reduce heat transfer by conduction and radiation, the mirror 25 is part spherical in shape, and the lamp 24 is provided with a locating ring (not shown), the position of which is fixed in a prefocussing jig relative to the filament, the prefocussed filament therefore providing a light source with less effective scatter in relation to the condenser lens.

The power supply (not shown) for the lamp is carried separately, and is constituted by a battery of dry cells in a container suitable for carrying in a users pocket, and this then enables the user to have complete freedom of movement. The dimensions of the lens magnifying systems are small, so that the user can see areas other than the work area with his peripheral vision.

A brief consideration of the above embodiment will indicate that the invention makes possible a very lightweight and cool operating headpiece which will illuminate a work area and which will magnify the image to an extent which is useful for working on the work area. It will be appreciated that the light source is concentrated on the work area and therefore makes the working very much simpler for a user. Since all lens systems are constituted by single lenses, the efficiency is high and low power can be used.

Further, it will be appreciated that the invention enables a beam of light to pass along the axis of observation, and thereby avoid a large degree of light scatter.

What I claim is:

1. An illuminating headpiece comprising: a spectacle frame, a pair of spectacle glasses in the frame, apertures in the glasses, a pair of secondary lens magnifying systems extending through the respective apertures and carried by the spectacle glasses, each secondary lens magnifying system being constituted by a single unitary element having an inner negative lens surface and an outer positive lens surface of an aspherical shape, a headpiece housing, a lamp housing carried by and extending upwardly from the headpiece housing, a lamp positioned within the lamp housing with its central axis extending vertically, a curved reflector at the rear of the lamp, a lens system at the front of the lamp, the lens system being constituted by a single element having an aspherical face, the curved reflector and the lens system having a common axis, a pivot means, said pivot means connecting the lamp housing to the headpiece housing whereby the direction of light transmitted by the lamp housing is varied when the lamp housing is tilted, means positioning the filament of said lamp substantially on the central axis of the reflector and lens system, the secondary lens magnifying systems being directed to have their axes intersect at a work plane.

2. An illuminating headpiece according to claim 1, wherein said inner negative lens surface is of toroidal shape.

3. An illuminating headpiece according to claim 1, wherein said inner negative lens surface is of spherical shape.

4. An illuminating headpiece according to claim 1 further comprising an infrared filter in front of the lamp housing means.